United States Patent
Nishino et al.

(10) Patent No.: US 7,430,157 B2
(45) Date of Patent: Sep. 30, 2008

(54) RECORDING DEVICE, RECORDING METHOD, REPRODUCING DEVICE, AND REPRODUCING METHOD

(75) Inventors: Masatoshi Nishino, Tokyo (JP); Junichi Horigome, Tokyo (JP); Takayoshi Chiba, Tokyo (JP); Hideo Tada, Tokyo (JP); Shigeo Yamaguchi, Kanagawa (JP); Masayoshi Nagata, Tokyo (JP); Yasuo Tone, Tokyo (JP)

(73) Assignee: Sony Corporation, Tokyo (JP)

( * ) Notice: Subject to any disclaimer, the term of this patent is extended or adjusted under 35 U.S.C. 154(b) by 227 days.

(21) Appl. No.: 10/543,746

(22) PCT Filed: Dec. 15, 2004

(86) PCT No.: PCT/JP2004/019154

§ 371 (c)(1),
(2), (4) Date: Jun. 6, 2006

(87) PCT Pub. No.: WO2005/059904

PCT Pub. Date: Jun. 30, 2005

(65) Prior Publication Data

US 2006/0256675 A1    Nov. 16, 2006

(30) Foreign Application Priority Data

Dec. 18, 2003   (JP)   ............... 2003-420674

(51) Int. Cl.
*G11B 5/09* (2006.01)
(52) U.S. Cl. ................ 369/53.24; 369/53.2; 369/53.41
(58) Field of Classification Search ................ None
See application file for complete search history.

(56) References Cited

U.S. PATENT DOCUMENTS

| 7,075,862 | B2 * | 7/2006 | Adachi | 369/30.11 |
| 2003/0179676 | A1 * | 9/2003 | Ito | 369/53.22 |
| 2006/0067190 | A1 * | 3/2006 | Kurobe et al. | 369/47.36 |

FOREIGN PATENT DOCUMENTS

| JP | 60-028029 | 2/1985 |
| JP | 62-188026 | 8/1987 |

(Continued)

OTHER PUBLICATIONS

Japanese Office Action issued on Mar. 11, 2008.

*Primary Examiner*—Muhammad N. Edun
(74) *Attorney, Agent, or Firm*—Sonnenschein Nath & Rosenthal LLP

(57) ABSTRACT

To enable a physically rewritable disc to be appropriately used as a write-once type.

When the rewritable disc is used in rewritable application, the position where writing of a predetermined data unit (for example, an ECC block) in data is started is set to a first position with respect to a reference position to record or play back the data. In contrast, when the rewritable disc is used in write-once application, the position where writing of the predetermined data unit in the data is started is set to a second position different from first position to record or play back the data. The position where writing of the data is started in the rewritable application is shifted from the position where writing of the data is started in the write-once application to disable rewriting of the data recorded on a rewritable recording medium when the rewritable recording medium for the write-once application is loaded in a recording-playback apparatus that does not assume the use of the rewritable recording medium in the write-once application.

10 Claims, 15 Drawing Sheets

FOREIGN PATENT DOCUMENTS

| | | |
|---|---|---|
| JP | 62-276648 | 12/1987 |
| JP | 01-208762 | 8/1989 |
| JP | 04-106761 | 4/1992 |
| JP | 04-232664 | 8/1992 |
| JP | 10-022149 | 4/1998 |
| JP | 2002-092873 | 3/2002 |
| JP | 2003-242650 | 8/2003 |
| JP | 2003-281734 | 10/2003 |

* cited by examiner

| BYTE POSITION | CONTENT | NUMBER OF BYTES |
|---|---|---|
| 0 | DISC CATEGORY/VERSION NUMBER | 1 |
| 1 | DISC SIZE | 1 |
| 2 | DISC STRUCTURE | 1 |
| 3 | RECORDING DENSITY | 1 |
| 4 to 15 | DATA ZONE ALLOCATION | 12 |
| 16 | SET TO (00) | 1 |
| 17 | DISC APPLICATION CODE | 1 |
| 18 | EXTENDED INFORMATION INDICATOR | 1 |
| 19 to 26 | DISC MANUFACTURER ID | 8 |
| 27 to 29 | MEDIUM TYPE ID | 3 |
| 30 | PRODUCT REVISION NUMBER | 1 |
| 31 | NUMBER OF PHYSICAL FORMAT INFORMATION BYTE IN USE IN ADIP UP TO BYTE 63 | 1 |
| 32 ⋮ 255 | | |

Fig.11

RECORDING DEVICE, RECORDING METHOD, REPRODUCING DEVICE, AND REPRODUCING METHOD

TECHNICAL FIELD

The present invention relates to a recording apparatus, a playback apparatus, a recording method, and a playback method which are capable of recording and/or playing back data on a recording medium, such as an optical disc.

BACKGROUND ART

Optical discs conforming to various standards, such as compact disc (CD), digital versatile disc (DVD), and Blu-ray disc standards, have been developed. The discs compliant with these standards are functionally divided into playback-only discs and recordable discs. The recordable discs are further divided into write-once discs in which data can be recorded only once and rewritable discs in which data can be rewritten.

For example, in the CD standard, compact discs digital audio (CD-DAs) and compact discs-read only memory (CD-ROMs) are classified into the playback-only discs, compact discs recordable (CD-Rs) are classified into the write-once discs, and compact discs rewritable (CD-RWs) are classified into the rewritable discs.

Generally, data on the playback-only discs cannot be physically rewritten because the data is represented by using embossed pits.

In the write-once discs, color-change recording layers are irradiated with laser light to cause changes in color in the recording layers in order to form pits.

In the rewritable discs, phase-change recording layers are irradiated with laser light to cause changes in phase in the recording layers in order to form pits (rewrite data).

Since the data on the rewritable discs can be rewritten any number of times, the data can be flexibly stored on the discs to provide superior usability.

In contrast, data can be recorded only once on the write-once discs. However, the advantage of disabling rewriting of the data is used to provide media suitable for data storage. For example, the write-once discs are suited to store important data which is desirable not to be falsified.

With regard to the recording operation of the rewritable discs, a technique in which the property in that repeatedly recording data on the same section deteriorates the phase-change recording layer is considered to vary the start point of recording is disclosed in Japanese Unexamined Patent Application Publication No. 8-10489.

The physical structure (the color change layer) of the write-once disc differs from that (the phase change layer) of the rewritable disc and the difference is defined in the respective discs. However, there is a request to perform the write-once recording on the rewritable disc.

Writing data on the rewritable disc only once can be achieved by, for example, a recording apparatus (disc drive apparatus) that controls the recording operation by using software. In other words, in order to use the loaded rewritable disc as a write-once disc, firmware that disables writing of data in areas where data has already been recorded, that is, firmware that disables rewriting of data is installed in the disc drive apparatus.

However, only the installation of the firmware cannot adequately use the advantage of the write-once disc.

It is important to take the advantage of blocking of falsification of data in the use of the rewritable disc as the write-once disc.

When the rewritable disc on which data can be physically rewritten is used as the write-once disc by controlling the installed firmware in a certain disc drive apparatus, rewriting of data (falsification of data) is not disabled. In other words, if the rewritable disc that is controlled by using the firmware such that data cannot be rewritten on the rewritable disc in a certain disc drive apparatus is loaded in a disc drive apparatus that does not assume the use of the rewritable disc as the write-once type, the rewritable disc is processed as the normal rewritable disc. As a result, rewriting of the data is attained on the rewritable disc.

Accordingly, there is little point in intentionally using the rewritable disc as the write-once disc.

There is a request to use the disc on which data can be physically rewritten as the write-once disc, and such request can be easily accommodated only in a certain disc drive apparatus. However, since the rewriting of data on such a disc cannot be disabled in all existing disc drive apparatuses, it is presumed that it is difficult to accommodate the above request.

Since the rewriting of data on such a disc cannot be disabled, it is presumed that it is difficult to accommodate the above request.

DISCLOSURE OF INVENTION

In order to resolve the above problems, it is an object of the present invention to disable rewriting of data on a physically rewritable disc in any disc drive apparatus, when the rewritable disc is to be used as a write-once type, to realize the advantage in using the rewritable disc as the write-once type.

A recording apparatus of the present invention includes recording means for recording data on a recording medium that is loaded and that has a rewritable physical structure; determining means for determining whether the loaded recording medium is used in rewritable application in which the data is capable of being rewritten or in write-once application in which the data is capable of being written only once; and controlling means for setting a position where writing of a predetermined data unit in the data is started to a first position with respect to a reference position to cause the recording means to record the data, when the determining means determines that the recording medium is used in the rewritable application, and for setting the position where writing of the predetermined data unit in the data is started to a second position with respect to the reference position to cause the recording means to record the data, when the determining means determines that the recording medium is used in the write-once application.

A playback apparatus of the present invention includes playback means for playing back data on a recording medium that is loaded and that has a rewritable physical structure; determining means for determining whether the loaded recording medium is used in rewritable application in which the data is capable of being rewritten or in write-once application in which the data is capable of being written only once; and controlling means for setting a position where writing of a predetermined data unit in the data is started to a first position with respect to a reference position to cause the playback means to play back the data, when the determining means determines that the recording medium is used in the rewritable application, and for setting the position where writing of the predetermined data unit in the data is started to a second position with respect to the reference position to cause the playback means to play back the data, when the determining means determines that the recording medium is used in the write-once application.

The determining means in the recording apparatus or in the playback apparatus determines whether the recording medium is used in the rewritable application or in the write-once application based on type information recoded on the recording medium as playback-only information that is not physically rewritable.

The recording medium has playback-only information recorded in a wobbling groove formed in a data track. The reference position is defined in units of information in the playback-only information in the wobbling groove.

The predetermined data unit is a unit of error correction block. The second position is set to a position where the error correction block cannot be extracted when the data recorded from the second position is played back from the first position.

A recording method of the present invention includes a determining step of determining whether a recording medium that is loaded and that has a rewritable physical structure is used in rewritable application in which data is capable of being rewritten or in write-once application in which the data is capable of being written only once; a first recording step of setting a position where writing of a predetermined data unit in the data is started to a first position with respect to a reference position in accordance with a recording instruction to record the data, when it is determined in the determining step that the recording medium is used in the rewritable application; and a second recording step of setting the position where writing of the predetermined data unit in the data is started to a second position with respect to the reference position in accordance with the recording instruction to record the data, when it is determined in the determining step that the recording medium is used in the write-once application.

A playback method of the present invention includes a determining step of determining whether a recording medium that is loaded and that has a rewritable physical structure is used in rewritable application in which data is capable of being rewritten or in write-once application in which the data is capable of being written only once; a first playback step of setting a position where writing of a predetermined data unit in the data is started to a first position with respect to a reference position in accordance with a playback instruction to play back the data, when it is determined in the determining step that the recording medium is used in the rewritable application; and a second playback step of setting the position where writing of the predetermined data unit in the data is started to a second position with respect to the reference position in accordance with the playback instruction to play back the data, when it is determined in the determining step that the recording medium is used in the write-once application.

According to the present invention, when the rewritable disc is used in the rewritable application, the position where writing of the predetermined data unit in the data is started is set to the first position with respect to the reference position to record or play back the data. The first position is defined in the disc format of the rewritable disc.

In contrast, when the rewritable disc is used in the write-once application, the position where writing of the predetermined data unit in the data is started is set to the second position different from first position to record or play back the data.

The position where writing of the data is started is set so as not to coincide with, for example, the position defined in the disc format of the rewritable disc. In this case, as described above, when the disc is loaded in another recording-playback apparatus (apparatus that does not assume the use of the rewritable disc in the write-once application), the data cannot be rewritten. In addition, the data cannot be played back because the position where writing of the data is started on the disc cannot be determined. If the rewriting is forcedly performed, the recorded data is damaged and, therefore, is not falsified.

BRIEF DESCRIPTION OF THE DRAWINGS

FIG. 11 is a diagram illustrating a PFI.

BEST MODE FOR CARRYING OUT THE INVENTION

A recording-playback apparatus (a disc drive apparatus) that records data on an optical disc, such as a rewritable disc having a phase-change recording layer, and/or plays back the data on the optical disc, according to an embodiment of the present invention, will be exemplified below. The recording-playback apparatus is described in the following order.

1. Area Structure of Disc
2. Wobble Format
3. Data Format
4. Position where Writing of Data is Started on Rewritable Disc
5. Structure of Disc Drive Apparatus
6. Recording-playback Operation in RW application and WO application 1. Area Structure of Disc Embodiments of the present invention are applicable to a recording-playback apparatus and a recording-playback method supporting disc media conforming to various standards, for example, the CD standard, the DVD standard, and the Blu-ray Disc standard, particularly disc media conforming to standards supporting rewritable discs. Although examples of the area structure of a disc, the wobble format, and the data format are shown below for the description of the embodiments, the formats of the disc media to which the present invention is applied are not limited to the following ones.

It is assumed that the disc medium whose operation is described in the examples is a rewritable disc that physically has a phase-change recording layer. A spiral groove wobbles on the disc. Addresses and a variety of management information (for example, physical information concerning the disc) are recorded in the wobbling groove. The information recorded in the wobbling groove is called Address In Pre-Groove (ADIP) information. The ADIP information, recorded in the wobbling groove, is playback-only information that cannot be rewritten.

For example, when the disc is loaded in the disc drive apparatus, information specific to the disc is read out from the ADIP information recorded in the wobbling groove formed in the recording surface to determine the disc format or the type of the disc (a ROM type, a rewritable type, a write-once type, etc.), the structure of a data zone, recommended operation values, and so on. The disc drive apparatus determines such information to appropriately perform the recording-playback operation. The area structure (data layout) of a disc is shown in FIG. 8.

Figure 8:
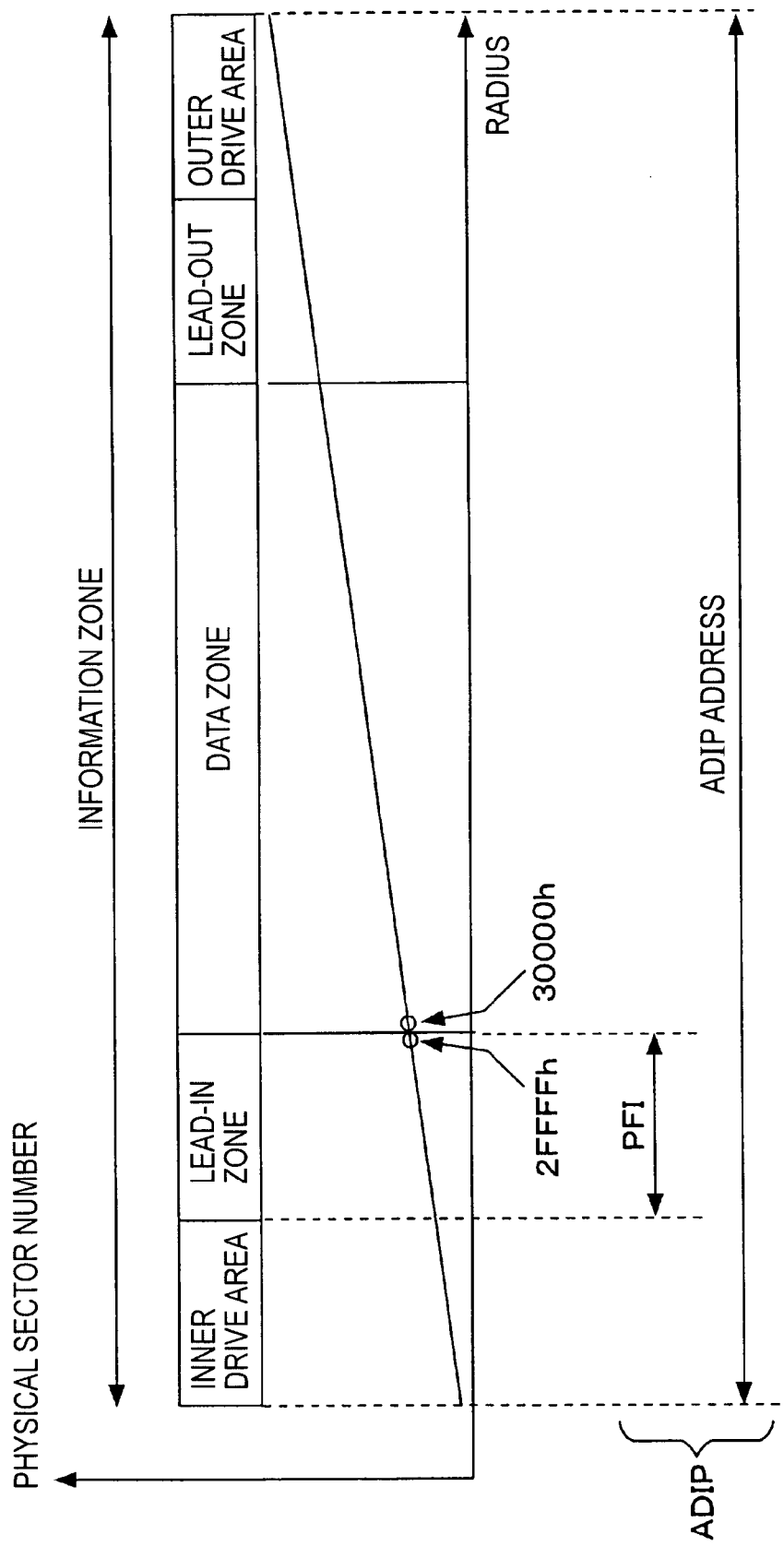
FIG. 8 is a diagram illustrating an area structure of the disc.

FIG. 8 schematically shows the radial area structure of the disc. In the logical data layout of the disc shown in FIG. 8, an information zone is formed from the inner side of the disc toward the outer side thereof. The information zone includes all the information required for ensuring the recording compatibility and playback compatibility of the data. The information zone mainly includes the following five zones.

Inner drive area
Lead-in zone (also referred to as a lead-in area)
Data zone (also referred to as a data area)
Lead-out zone (also referred to as a lead-out area)
Outer drive area The inner drive area and the outer drive area are dedicated to a recording apparatus (areas that are not acceded to in a playback-only apparatus). In order to record information, the laser power during the recording must be adjusted so as to form correct recording marks. For this purpose, a test zone for use in test recording for determining the optimum recording conditions and an area where the management information relating to the recording conditions is recorded are formed in each of the inner drive area and the outer drive area.

Physical sector numbers (PSNs) are allocated as absolute positional information on the disc.

As shown in FIG. 8, for example, the values of the physical sector numbers are increased from the inner side of the disc toward the outer side thereof. In examples of the values shown, PSN=2FFFFh (a numerical value having an h added is a hexadecimal number) indicates the end point of the lead-in zone and PSN=30000h indicates the start point of the data zone.

User data is basically written in the data zone. The management information is written in the lead-in zone. Dummy data used for maintaining the compatibility with the playback-only disc is written in the lead-out zone. The management information having approximately the same content as that of the lean-in zone may be recorded in the lead-out zone.

Data can be written in the entire information zone. As described above, the wobbling groove is formed as the recording track. Tracking along the groove allows the track to be appropriately traced during the recording in an area where the pits (phase-change pit marks) are not formed and, therefore, where the information is not recorded.

The ADIP information is recorded in the wobbling groove, and the physical sector numbers described above are recorded in the entire information zone as ADIP addresses.

Although described in detail below, physical format information (PFI) is also recorded as the ADIP information, in addition to the ADIP addresses.

As particularly shown in FIG. 8, the PFI is repeatedly recorded in the lead-in zone as the ADIP information.

2. Wobble Format

The structure of the ADIP information recorded in the wobbling groove will be described below.

Figure 9A:
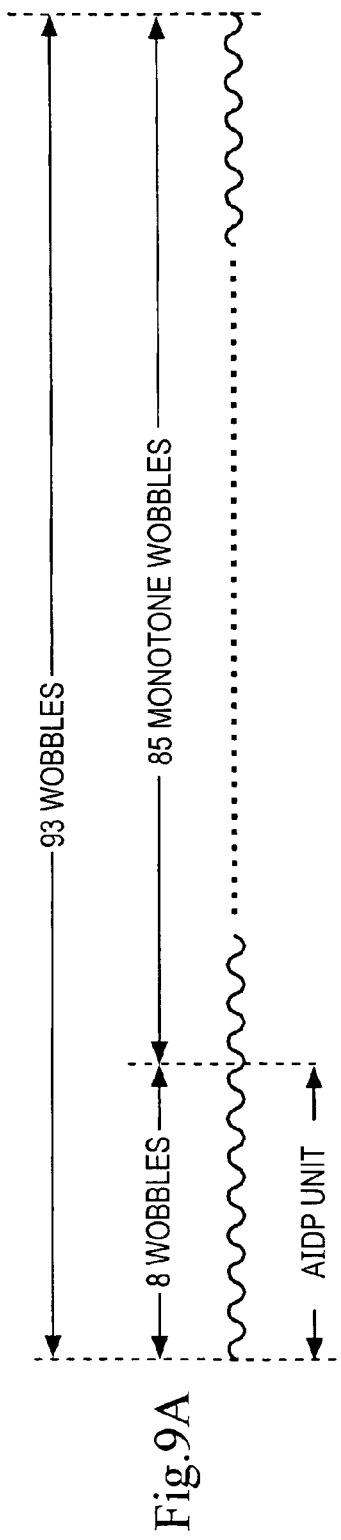
FIGS. 9A and 9B are diagrams illustrating a wobble structure.

FIG. 9A shows a unit of wobbling. One wobble corresponds to a section of 32 channel bits. Ninety-three wobbles including eight wobbles and 85 monotone wobbles form a unit having one ADIP unit.

The 85 monotone wobbles corresponds to a wobble section including 85 unmodulated waves. The first eight wobbles, which are subjected to phase modulation in accordance with the information, have information corresponding to one ADIP unit.

Figure 9B:
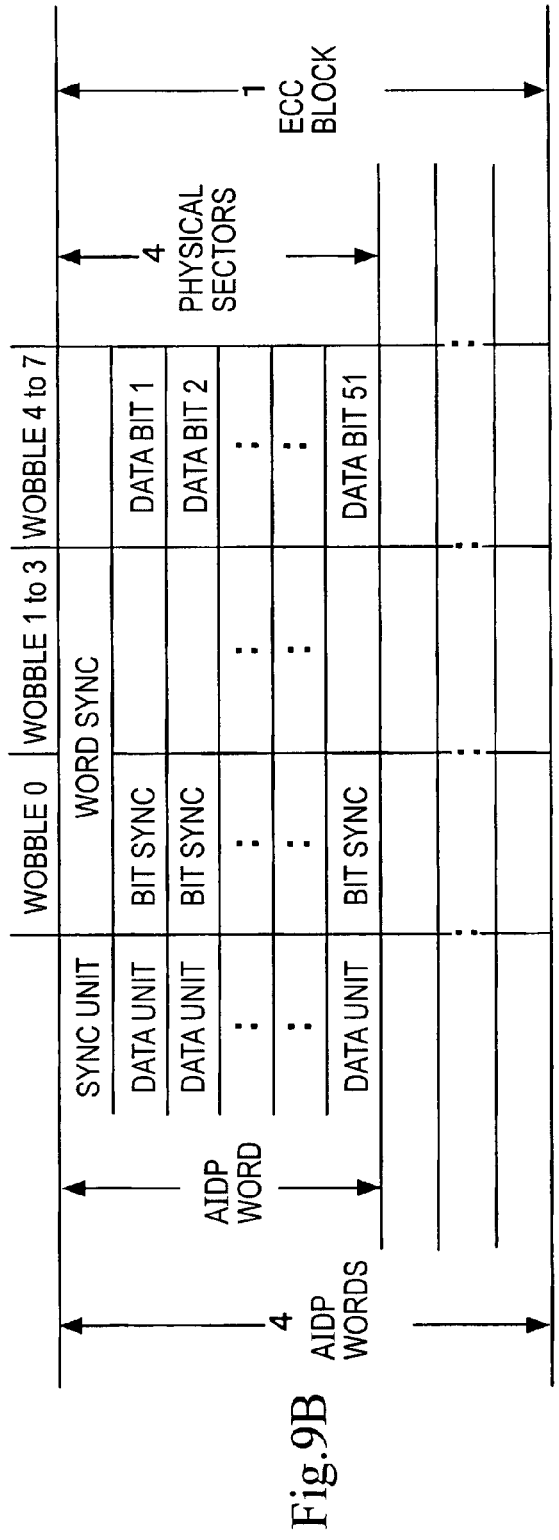

FIG. 9B shows the structure of an ADIP word.

The eight wobbles correspond to one ADIP unit, as described above. Fifty-two ADIP units form one ADIP word.

"Wobble 0", "Wobble 1 to 3", and "Wobble 4 to 7" in FIG. 9B indicate the respective eight wobbles corresponding to one ADIP unit.

The top ADIP unit of the ADIP word is referred to as a sync unit. The "Wobble 0" and "Wobble 1 to 3" are phase-modulated wobbles as a word sync.

The second and subsequent ADIP units in the ADIP word are data units. The data units in the "Wobble 0" denote bit syncs and the data units in the "Wobble 4 to 7" denote data bits ("1" or "0" as data).

One ADIP word including the 52 ADIP units corresponds to four physical sectors (described below).

The four ADIP words form one error correction code (ECC) block as the ADIP information.

Figure 10:
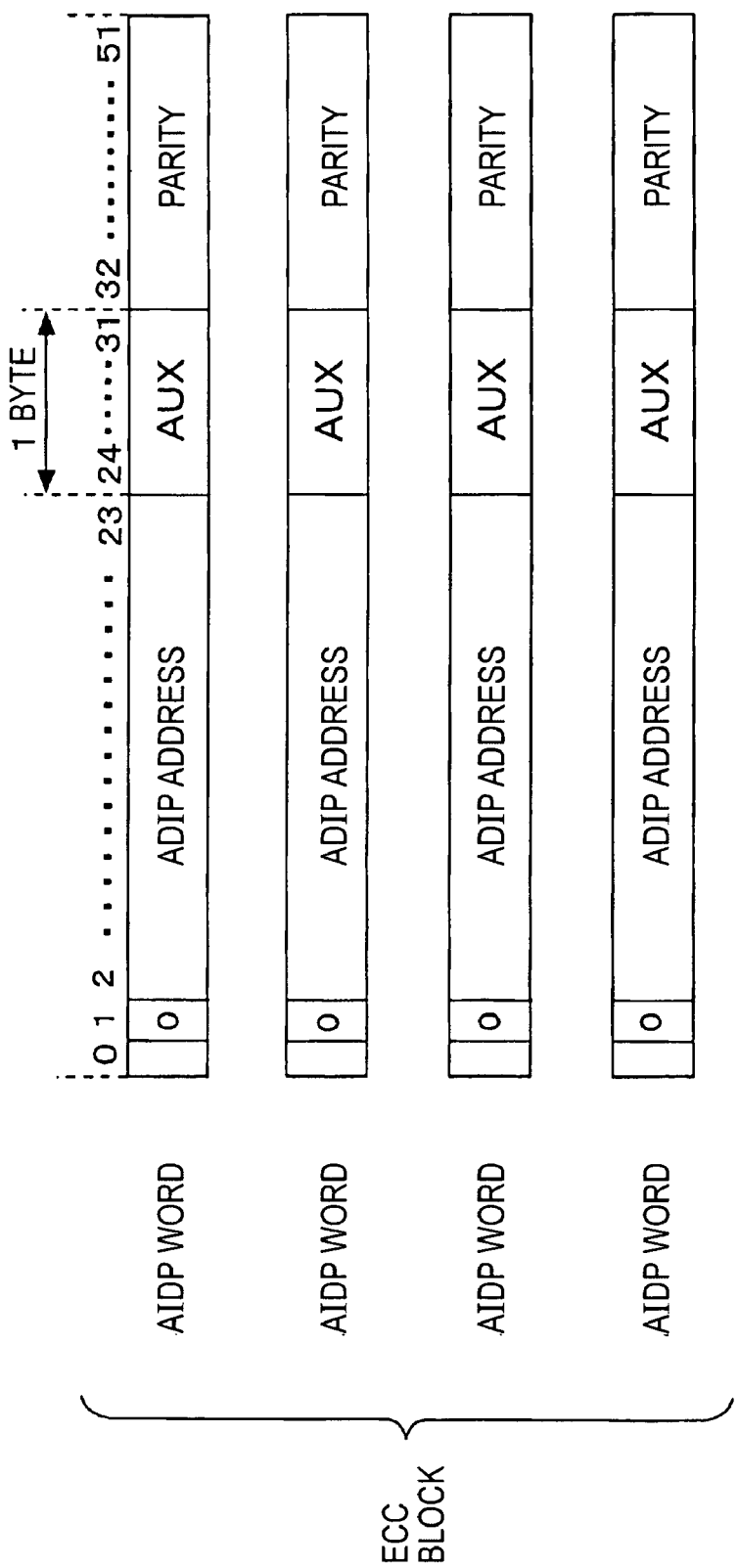
FIG. 10 is a diagram illustrating ADIP words.

FIG. 10 shows the four ADIP words forming one ECC block in the ADIP.

The data of 51 bits (data bits 1 to 51), excluding the word sync, is extracted from one ADIP word, as described above. The ADIP addresses are recorded in the data bits 2 to 23.

AUX data is recorded in data bits 24 to 31.

ECC parity bits are recorded in the data bits 32 to 51.

The ADIP addresses in the data bits 2 to 23 are recorded in the entire information zone.

The PFI (physical format information) is recorded as the AUX data having one byte for every ADIP word (the AUX data having four bytes for every ECC block) in the ADIP information in the lead-in zone.

The PFI of 256 bytes forms one unit of information. In other words, the AUX data of four bytes is provided for every ECC block and the AUX data of 256 bytes forms the PFI shown in FIG. 11. Such PFI is repeatedly recorded as the AUX data in the lead-in zone.

As shown in FIG. 11, the PFI includes a variety of physical format information, including the disc category/version number, the disc size, the disc structure, the recording density, the data zone allocation, the disc application code, the extended information indicator, the disc manufacturer ID, and the medium type ID, . . . in predetermined byte positions.

The PFI indicates a variety of information relating to the disc. The information includes the disc type, the disc size, the zone structure, and information concerning the linear velocity during the recording-playback operation.

3. Data Format

The physical sector structure of the data (data recorded based on changes in phase) recorded on the recording track formed of the wobbling groove having the above ADIP information will be described below.

Physical sectors (hereinafter also referred to as sectors) are continuously arranged in each zone shown in FIG. 8.

Figure 12:
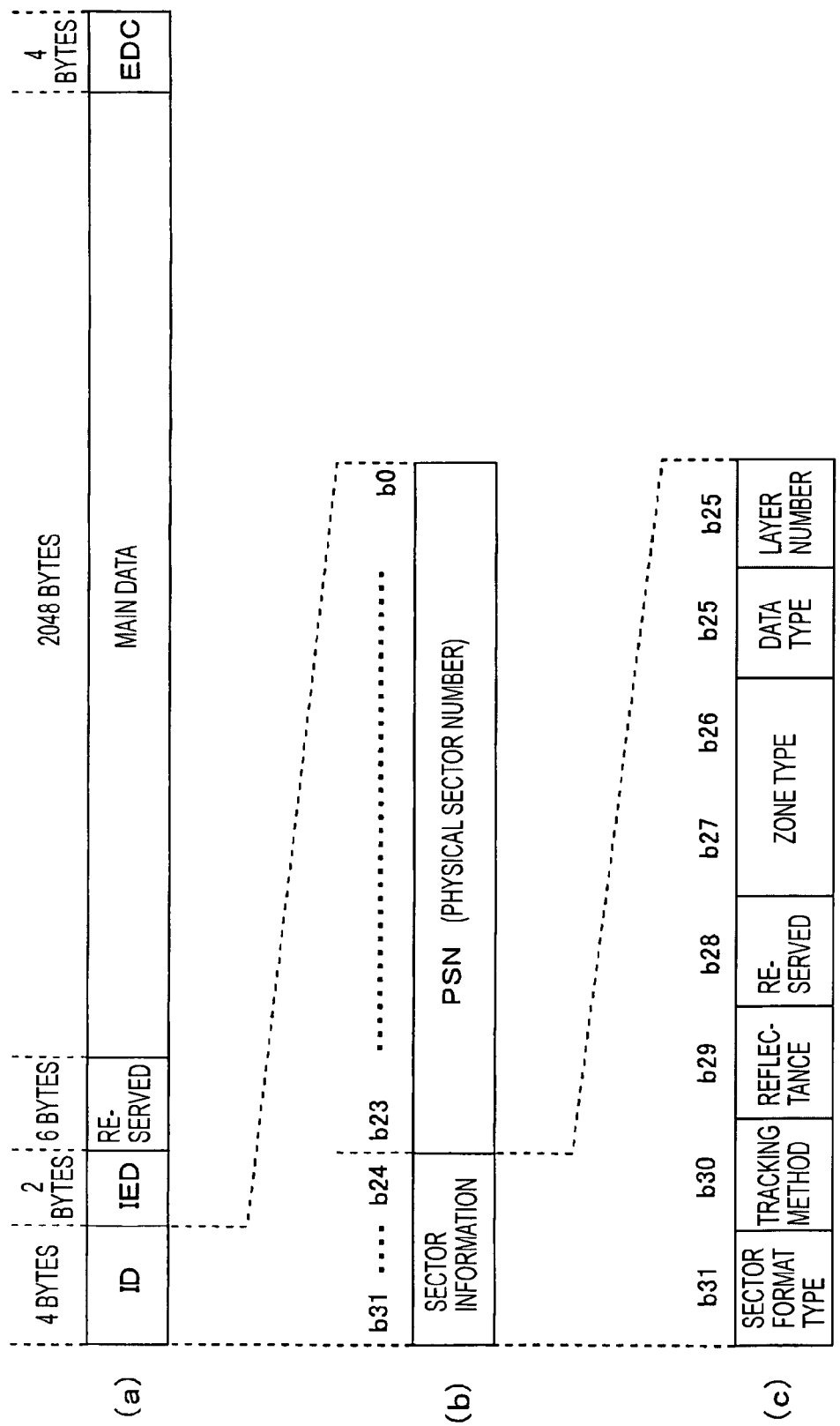
FIG. 12 is a diagram illustrating a sector format of the disc.

As shown in FIG. 12(*a*), one sector includes an ID field of four bytes, an ID error detection code (IED) field of two bytes, a reserved field of six bytes, a main data field of 2048 bytes, and an error detection code (EDC) field of four bytes.

The ID field has the header information of the sector.

The IED field has error detection codes of the data in the ID field.

The main data field has main data of 2048 bytes. For example, the user data is recorded as the main data in the sectors in the data zone.

The management information is recorded as the main data in the sectors in the lead-in zone.

The EDC field has error detection codes of the data in the section from the ID field to the main data field.

The structure of the ID field is shown in FIG. 12(*b*).

In the ID field of four bytes (32 bits), the PSNs are recorded in 24 bits from bit b0 to b23. The PSNs in the ID field indicate the physical addresses.

Sector information is recorded in eight bits from bit b24 to b31.

The content of the sector information is shown in FIG. 12(*c*).

The layer number of the recording layer including the sector is recorded in a bit b24.

A data type indicating, for example, rewritable data is recorded in a bit b25.

A zone type is recorded in bits b26 and b27. In other words, the zone including the sector is indicated in the bits b26 and b27. The zone type is the data zone if these two bits are set to "00", the zone type is the lead-in zone if these two bits are set to "01", and the zone type is the lead-out zone if these two bits are set to "10".

A bit b28 is reserved.

A value indicating the reflectance is recorded in a bit b29.

A value indicating the tracking method (for example, groove tracking) is recorded in a bit b30.

A value indicating the sector format type (for example, a constant linear velocity (CLV) format) is recorded in a bit b31.

Figure 13:
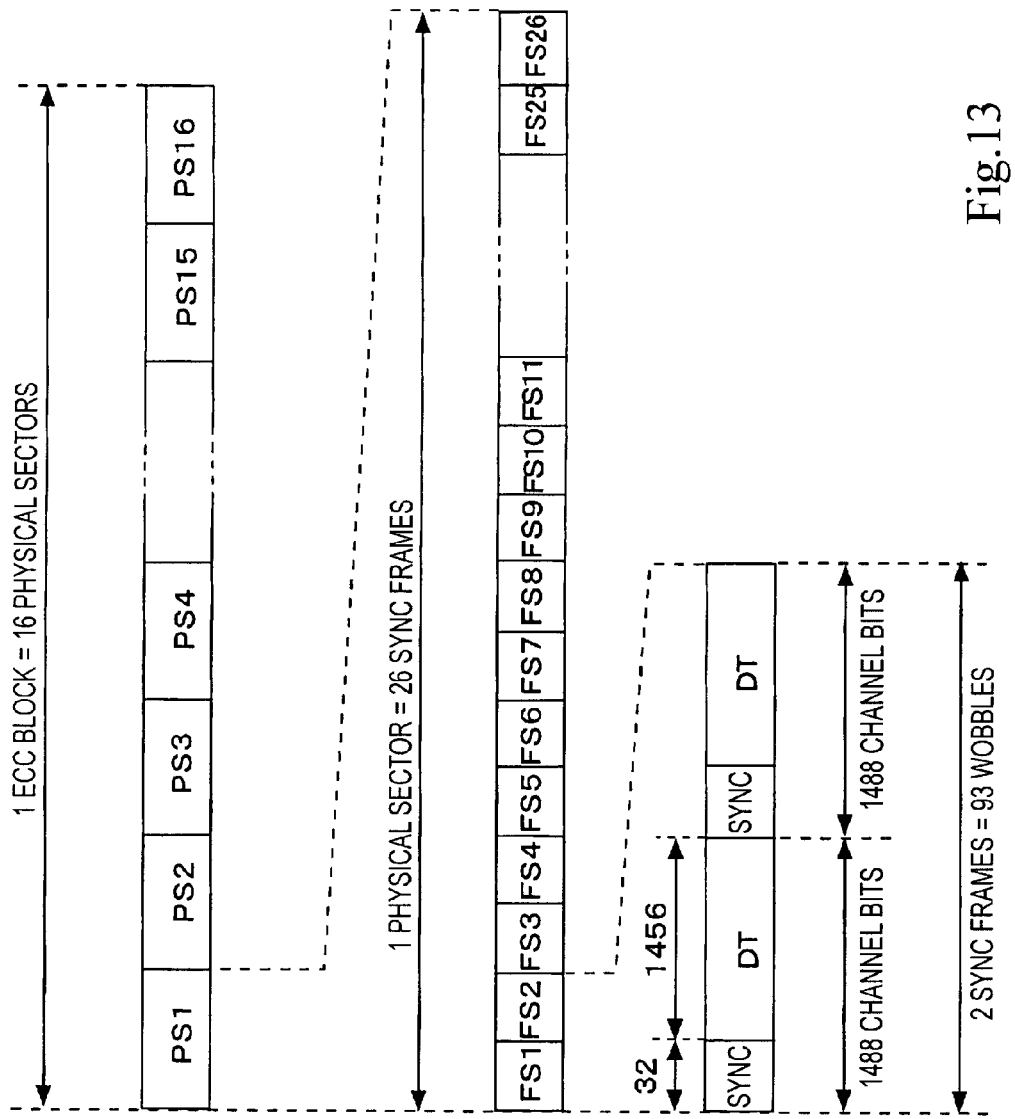
FIG. 13 is a diagram illustrating a data format of the disc.

The sector structure described above is shown as physical sectors PS1 to PS16 in FIG. 13. The continuous 16 physical sectors PS1 to PS16 form one ECC block as a data block.

One physical sector PS includes 26 sync frames SF1 to SF26. The sync frame SF is represented in units of 1488 channel bits and includes a frame sync pattern of 32 channel bits and data DT of 1456 channel bits, as shown in FIG. 13.

The two sync frames (a section of 2974 channel bits) correspond to a section length of 93 wobbles (one wobble=32 channel bits).

Figure 14:
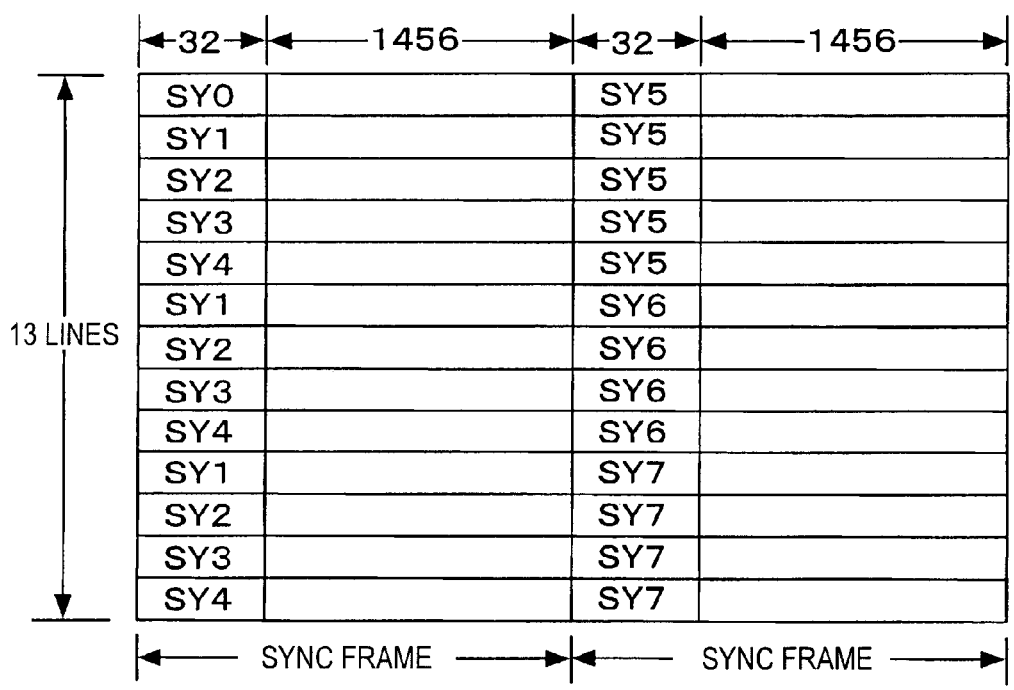
FIG. 14 is a diagram illustrating a physical sector structure.

A pattern example (physical sector) of one sector, that is, an example of the frame sync pattern including the 26 sync frames SF1 to SF26, is shown in FIG. 14.

Eight sync patterns SY0 to SY7 are set as the frame sync patterns. Since the eight patterns are allocated to each of the sync frames SF1 to SF26, as shown in FIG. 14, the frame position (any of the sync frames SF1 to SF26) in the sector can be detected based on the arrangement of the patterns of the sync frames.

4. Position where Writing of Data is Started on Rewritable Disc

Figure 15:
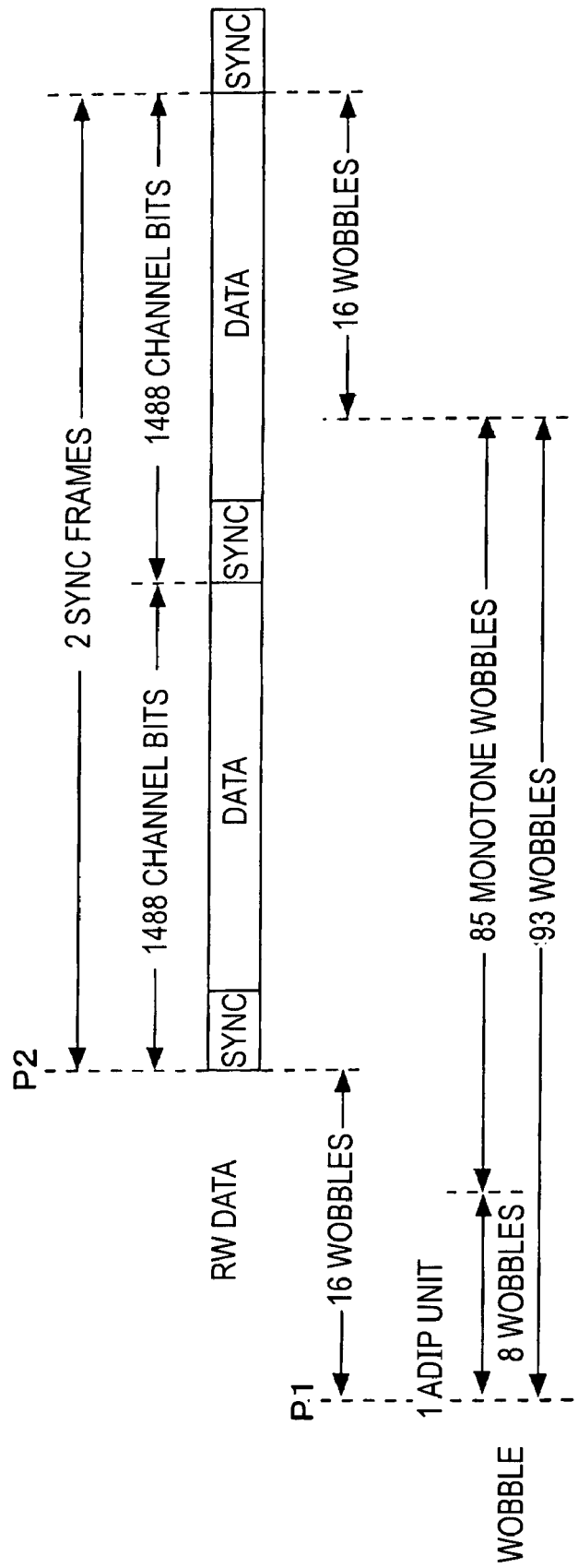
FIG. 15 is a diagram illustrating the relationship between wobbles and the position where writing of the RW data is started.

Positions where writing of data is started, when the data having the physical structure described above is to be recorded on the recording track formed of the wobbling groove, are shown in FIG. 15. Referring to FIG. 15, P1 denotes a wobble reference position and P2 denotes a position where writing of RW data is started.

In the recording of data on the rewritable disc, the head of the ADIP word structure shown in FIG. 9B corresponds to the wobble reference position P1 and the position away from the position P1 by 16 wobbles corresponds to the position P2 where the writing of the rewritable data is started.

Since the section including the two sync frames in FIG. 15 has a section length of 93 wobbles, the two sync frames in which the RW data is recorded are shifted from the ADIP unit by 16 wobbles.

One wobble corresponds to 32 channel bits.

According to this embodiment, the rewritable disc physically having the phase-change recording layer is used not only in rewritable application but also in write-once application.

Writing of data is started at the position P2 away from the position P1 by 16 wobbles, as shown in FIG. 15, when the rewritable disc is used in the rewritable application.

5. Structure of Disc Drive Apparatus

Figure 1:
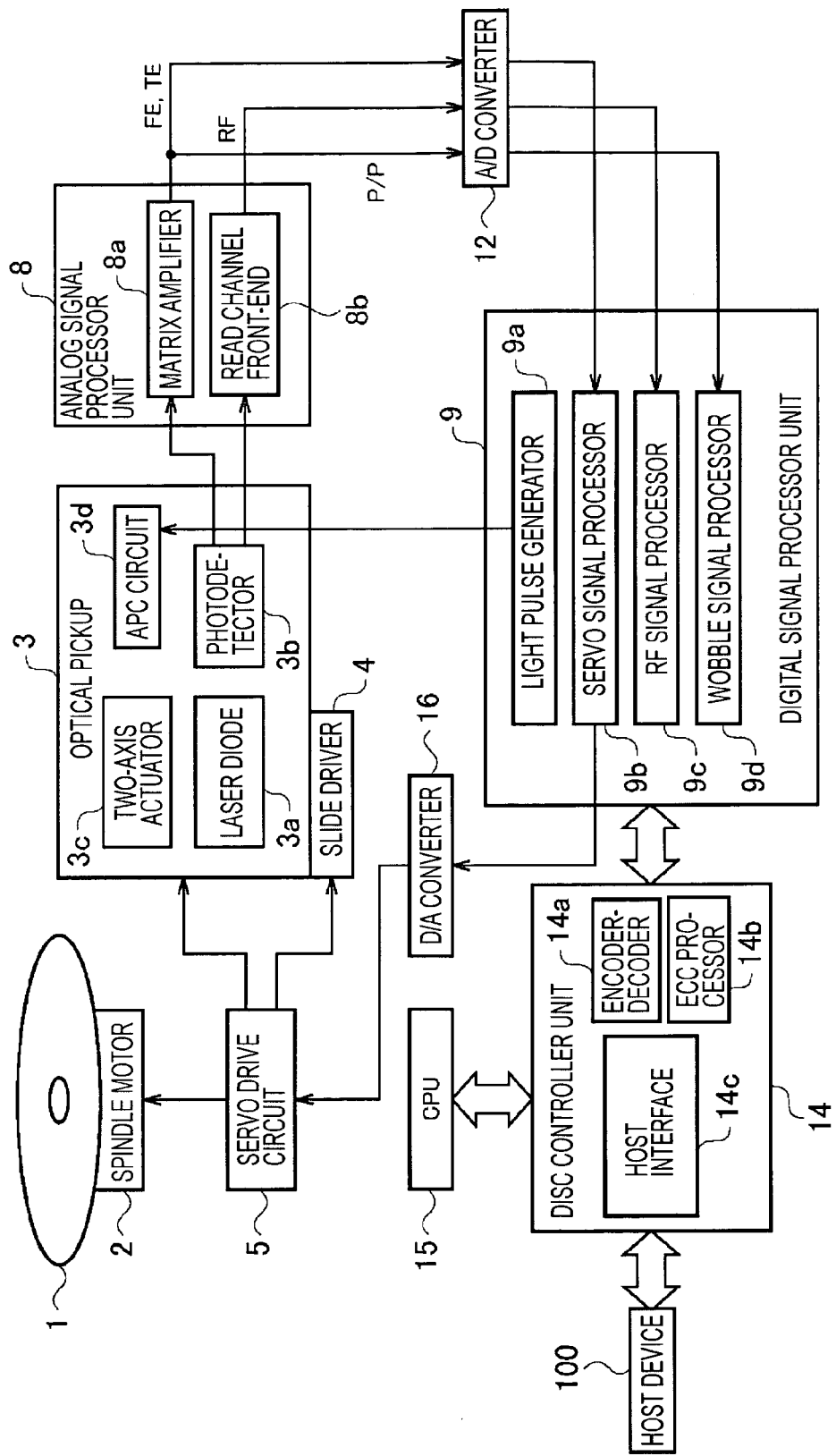
FIG. 1 is a block diagram of a recording-playback apparatus according to an embodiment of the present invention.

The structure of the disc drive apparatus according to this embodiment will be described below with reference to FIG. 1.

A disc 1 a rewritable disc (phase-change disc) having the structure described above. The disc 1 may be a ROM disc (disc having the embossed pits) or a write-once disc (color-change disc) conforming to the same standard.

The disc 1 is mounted on a turntable (not shown) and is rotated and driven by a spindle motor 2 at a constant linear velocity (CLV) or a constant angular velocity (CAV) in the recording-playback operation. An optical pickup 3 reads out data recorded on the disc 1, for example, in an embossed-pit mode, in a color-change pit mode, or a phase-change pit mode, and the ADIP information recorded in the wobbling groove.

The optical pickup 3 includes a laser diode 3*a* serving as a laser light source, a photodetector 3*b* detecting reflected light, a two-axis actuator 3*c* holding an objective lens transmitting laser light, and an automatic power control (APC) circuit 3*d* controlling the output of the laser light from the laser diode 3*a*. The optical pickup 3 also includes, for example, an optical system that transmits the laser light with which the recording surface of the disc is irradiated through the objective lens and that leads the reflected light to the photodetector 3*b*, although not shown in FIG. 1.

The two-axis actuator 3*c* holds the objective lens so as to be capable of traveling in the direction of tracking and in the focal direction.

The overall optical pickup 3 is capable of moving in the radial direction of the disc with a slide driver 4.

The information concerning the light reflected from the disc 1 is detected by the photodetector 3*b* and is supplied to an analog signal processor unit 8 as an electrical signal corresponding to the amount of received light.

In the analog signal processor unit 8, a matrix amplifier 8*a* performs matrix calculation for the signal from each light receiving section in the photodetector 3*b*. The matrix amplifier 8*a* generates, for example, a focus error signal FE and a tracking error signal TE used for servo control and also generates a push/pull signal P/P as the information concerning the wobbling groove.

In the analog signal processor unit 8, a read channel front-end 8b generates a playback radio frequency (RF) signal.

The RF signal, the focus error signal FE, the tracking error signal TE, and the push/pull signal P/P are converted into digital signals by an analog-digital (A/D) converter 12, and the digital signals are supplied to a digital signal processor unit 9.

The digital signal processor unit 9 includes a light pulse generator 9a, a servo signal processor 9b, an RF signal processor 9c, and a wobble signal processor 9d.

The push/pull signal P/P, generated by the matrix amplifier 8a and converted into the digital signal by the A/D converter, is decoded in the wobble signal processor 9d to extract ADIP information. The addresses, the physical format information, and the like extracted as the ADIP information are supplied to a CPU 15 through a disc controller unit 14.

The servo signal processor 9b generates various servo drive signals, including focus, tracking, slide, and spindle servo drive signals, from the supplied focus error signal FE and tracking error signal TE and from information concerning the rotational speed detected in, for example, phase locked loop (PLL) processing in the RF signal processor 9c to perform servo operations.

The servo drive signals are supplied to a servo drive circuit 5 through a digital-analog (D/A) converter 16. The servo drive circuit 5 drives the two-axis actuator 3c based on the focus and tracking servo drive signals to perform focus servo and tracking servo operations. The servo drive circuit 5 also drives the slide driver 4 based on the slide servo drive signal to move the optical pickup 3. The servo drive circuit 5 further rotates and drives the spindle motor 2 based on the spindle servo drive signal.

The servo signal processor 9b supplies the above signals to the servo drive circuit 5 so as to perform focus search, track jump, seek, and other operations in response to instructions from the CPU 15.

The RF signal, generated by the read channel front-end 8b and converted into the digital signal by the A/D converter 12, is processed by the RF signal processor 9c and is then supplied to the disc controller unit 14.

The disc controller unit 14 includes an encoder-decoder 14a, an ECC processor 14b, and a host interface 14c.

In the playback operation in the disc controller unit 14, the data supplied from the RF signal processor 9c is decoded by the encoder-decoder 14a and is subjected to error correction by the ECC processor 14b to provide playback data.

The disc controller unit 14 extracts subcode information, address information, management information, and additional information from the information yielded in the decoding and supplies such information to the CPU 15.

The playback data is transferred from the host interface 14c to an external host device 100 (for example, a personal computer) under the control of the CPU 15 functioning as the controller of the disc drive apparatus.

In other words, the CPU 15 transmits and receives the playback data, a read or write command, and so on to and from the host device 100 through the host interface 14c. The CPU 15 controls the playback operation on the disc 1 in accordance with the read command transmitted from the host device 100 and transfers the decoded playback data.

In contrast, the CPU 15 receives the write command and record data from the host device 100 to perform the recording operation on the disc 1.

In the recording operation, an error correction code is appended to the record data transmitted from the host device 100 by the ECC processor 14b and the record data having the error correction code appended is encoded by the encoder-decoder 14a.

The encoded record data is supplied to the light pulse generator 9a in the digital signal processor unit 9. The light pulse generator 9a performs wave shaping and the like for the encoded record data and supplies the record data to the APC circuit 3d as laser modulation data.

The APC circuit 3d drives the laser diode 3a in accordance with the laser modulation data to output the laser light in accordance with the record data and writes the data on the disc 1.

When the disc 1 is the rewritable disc having the phase-change recording layer, applying the laser light to the rewritable disc varies the crystal structure in the recording layer to form phase-change pits. In other words, a variety of data is recorded on the disc 1 depending on the presence of the pits and the varied lengths thereof. Irradiating the parts where the pits have been formed with the laser light to heat the parts restores the crystal structure that has changed in the recording of the data to the original state, and the formed pits disappear to delete the data.

6. Recording-Playback Operation in RW Application and WO Application

In the disc drive apparatus according to this embodiment, the rewritable disc may be used not only in the rewritable application but also in the write-once application.

For differentiation, pit data (phase-change pit data) recorded on the rewritable disc used in the rewritable application is referred to as RW data, and data (also phase-change pit data) recorded on the rewritable disc used in the write-once application is referred to as WO data.

As described above, when the rewritable disc is used in the write-once application, it is necessary to ensure disabling of rewriting of the phase-change pit data, which is physically rewritable. When the rewritable disc is loaded in another recording-playback apparatus, it is also necessary to disable the rewriting of the data.

According to this embodiment, the position where the writing of data is started in the rewritable application is shifted from the position where the writing of data is started in the write-once application to disable the rewriting of data in the write-once application.

The difference in the position where the writing of data is started between when the RW data is recorded and when the WO data is recorded will be described below with reference to FIGS. 2 and 3.

The wobble reference position is denoted by P1 and the position where writing of RW data is started is denoted by P2.

Figure 2:
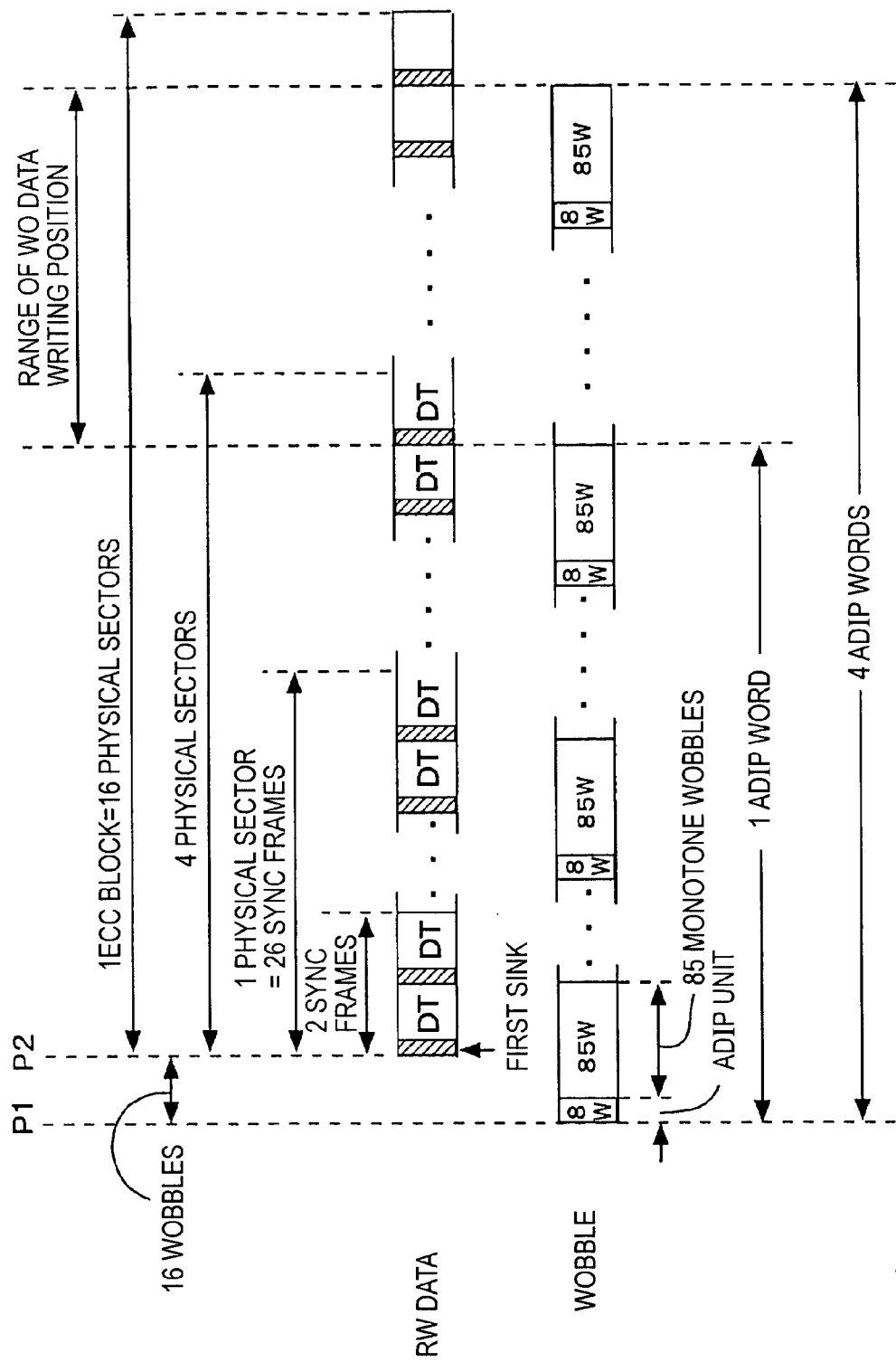
FIG. 2 is a diagram illustrating a position where writing of RW data is started according to an embodiment.

FIG. 2 shows the position where writing of the one ECC block of the RW data is started with respect to the wobbles, when the rewritable disc is used in the rewritable application.

As described above, in the wobbling groove, the sector of 93 wobbles includes the ADIP unit of eight wobbles and the 85 monotone wobbles. Fifty-two ADIP units form one ADIP word and four ADIP words form one ECC block.

In the data recorded as the phase-change pits, 26 sync frames form one physical sector and 16 physical sectors form one ECC block.

On the assumption that the ADIP word structure is started at the wobble reference position P1, writing of the RW data is started at the position P2 away from the reference position P1 by 16 wobbles, as described above with reference to FIG. 15. FIG. 2 shows the ECC block of the RW data having the writing start position at the position P2 with respect to the ADIP word structure of the wobbles.

In contrast, when the WO data is recorded on the rewritable disc used in the write-once application, the position where writing of the data is started is set within a range of the WO data writing start position shown in FIG. 2.

The range of the WO data writing start position is set in a range away from the reference position P1 by more than one ADIP word and less than four ADIP words.

Figure 3:
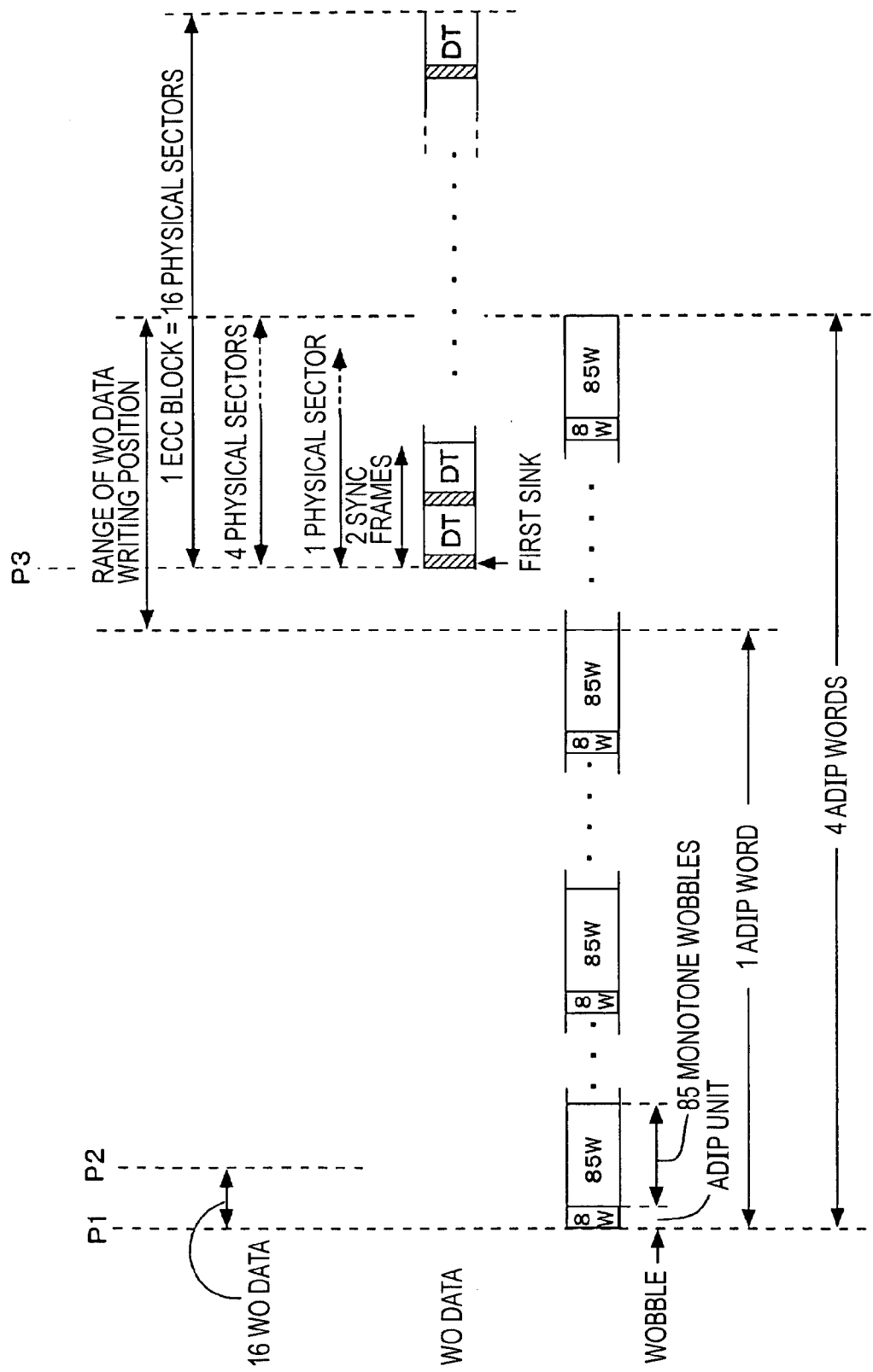
FIG. 3 is a diagram illustrating a position where writing of WO data is started according to an embodiment.

FIG. 3 shows an example in which writing of the WO data is started at a position P3 within the range of the WO data writing start position.

Although the RW data has the same structure of the physical sector and the ECC block as that of the WO data, writing of the RW data is started at the position P2 with respect to the reference position P1 whereas writing of the WO data is started at the position P3 with respect to the reference position P1.

Setting the position where writing of the WO data is started in this manner allows rewriting of the WO data to be disabled in any recording-playback apparatus, although the WO data is recorded as the phase-change pits and is physically rewritable.

The reasons of this will be described with reference to FIGS. 4 and 5.

Figure 4:
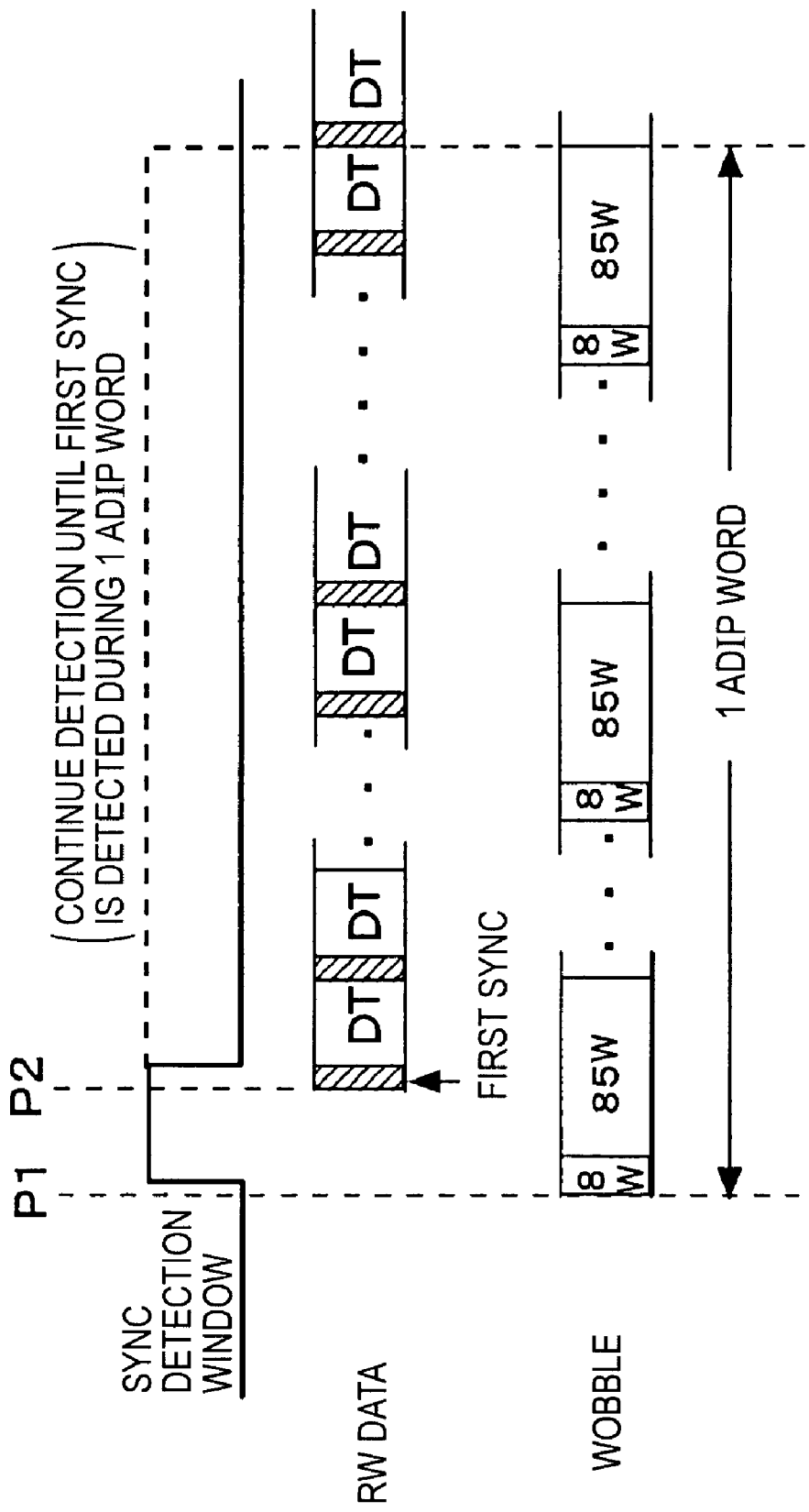
FIG. 4 is a diagram illustrating detection of a first sync in the RW data.
Figure 5:
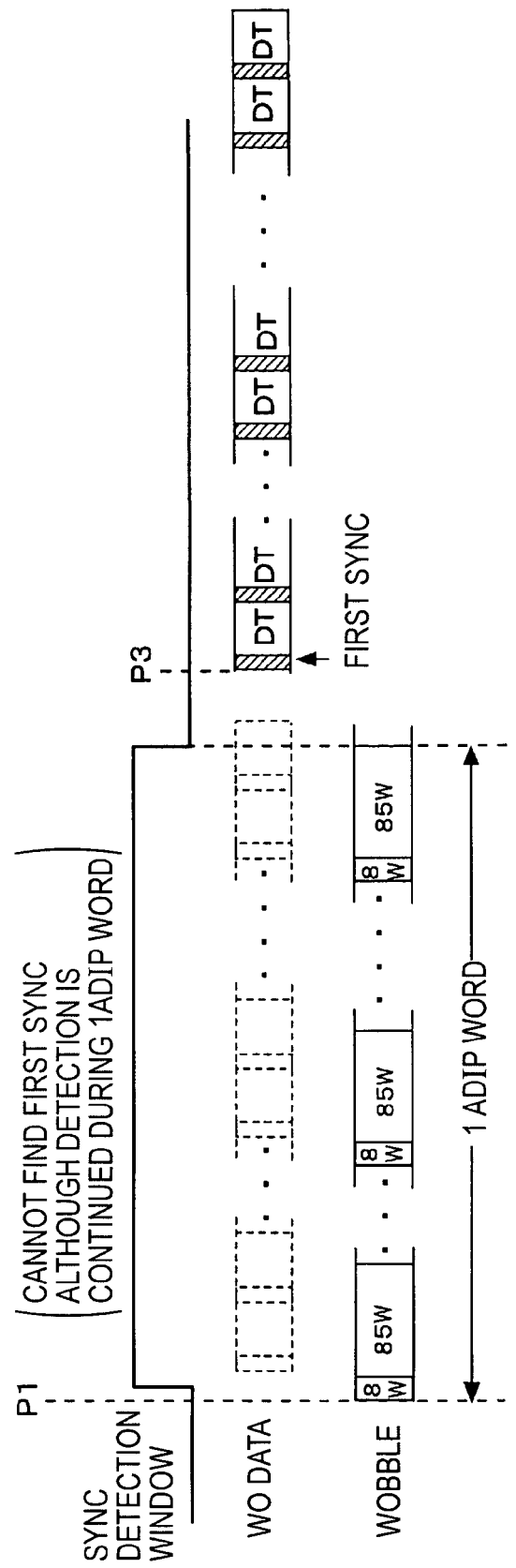
FIG. 5 is a diagram illustrating disabling of detection of the first sync in the WO data according to an embodiment.

FIG. 4 shows an example of the RW data. When the recorded RW data is to be read out, the disc drive apparatus seeks the head of the ECC block (first sync: the frame sync pattern of the first sync frame). For this purpose, the disc drive apparatus generally opens a sync detection window in a section up to one ADIP word, as shown in FIG. 4, to detect the first sync of the ECC block of the recorded data.

The sync detection window is opened at the timing corresponding to the wobble reference position P1 and is closed at the timing when the first sync is detected. If the first sync cannot be detected, the sync detection window is kept open in a section up to one ADIP word, as shown by a broken line in FIG. 4. For example, the first sync is normally detected at the timing corresponding to the position away from the reference position P1 by 16 wobbles and the sync frame ends.

The first sync is recognized as the position where writing of the data in units of ECC block is started to appropriately perform decoding in units of ECC block.

In contrast, in the case of the WO data, when writing of the WO data is started at a position P3 in FIG. 3, the normal disc drive apparatus cannot detect the first sync.

This is because the first sync frame including the first sync does not exist in a section of one ADIP word from the reference position P1, during which the sync detection window is opened.

Specifically, since the position P3 where writing of the WO data is started is set in a range away from the reference position P1 by more than one ADIP word and less than four ADIP words, the position where writing of the WO data is started cannot be detected by a normal readout method of the rewritable disc and the data cannot be appropriately extracted in units of ECC block.

Accordingly, with a normal disc drive apparatus, that is, with an apparatus that does not assume the use of the rewritable disc in the write-once application, the WO data recorded on the rewritable disc used in the write-once application cannot be played back and cannot also be rewritten for falsification.

Although new data can be written on the rewritable disc because of the physically rewritable disc, the recorded WO data is damaged in the writing of the new data.

The WO data writing start position is set in the range away from the reference position P1 by less than the four ADIP words because one ECC block corresponds to the four ADIP words. In other words, exceeding the four ADIP words means less than four ADIP word.

Figure 6:
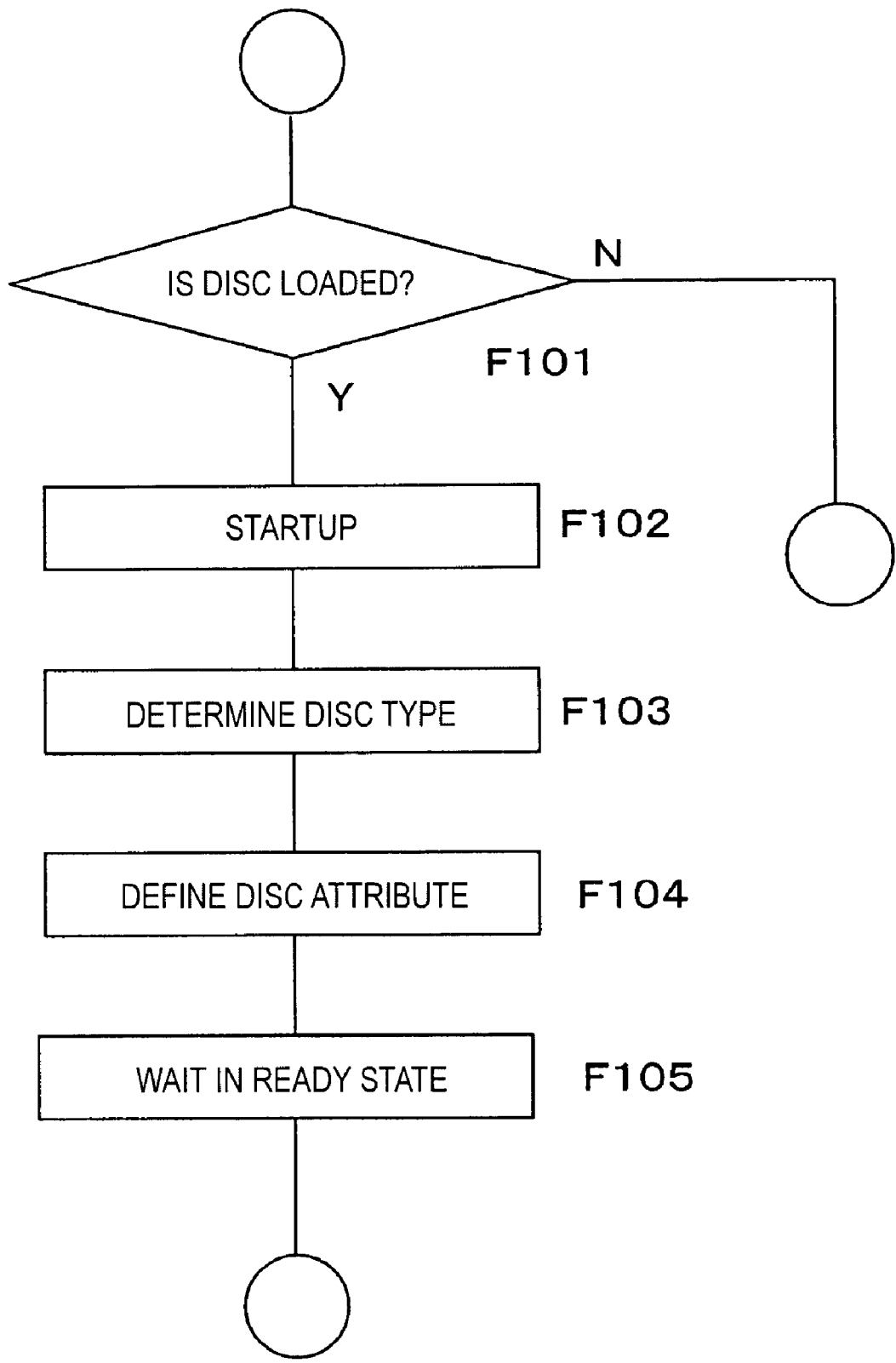
FIG. 6 is a flowchart showing a process when a disc is loaded according to an embodiment.
Figure 7:
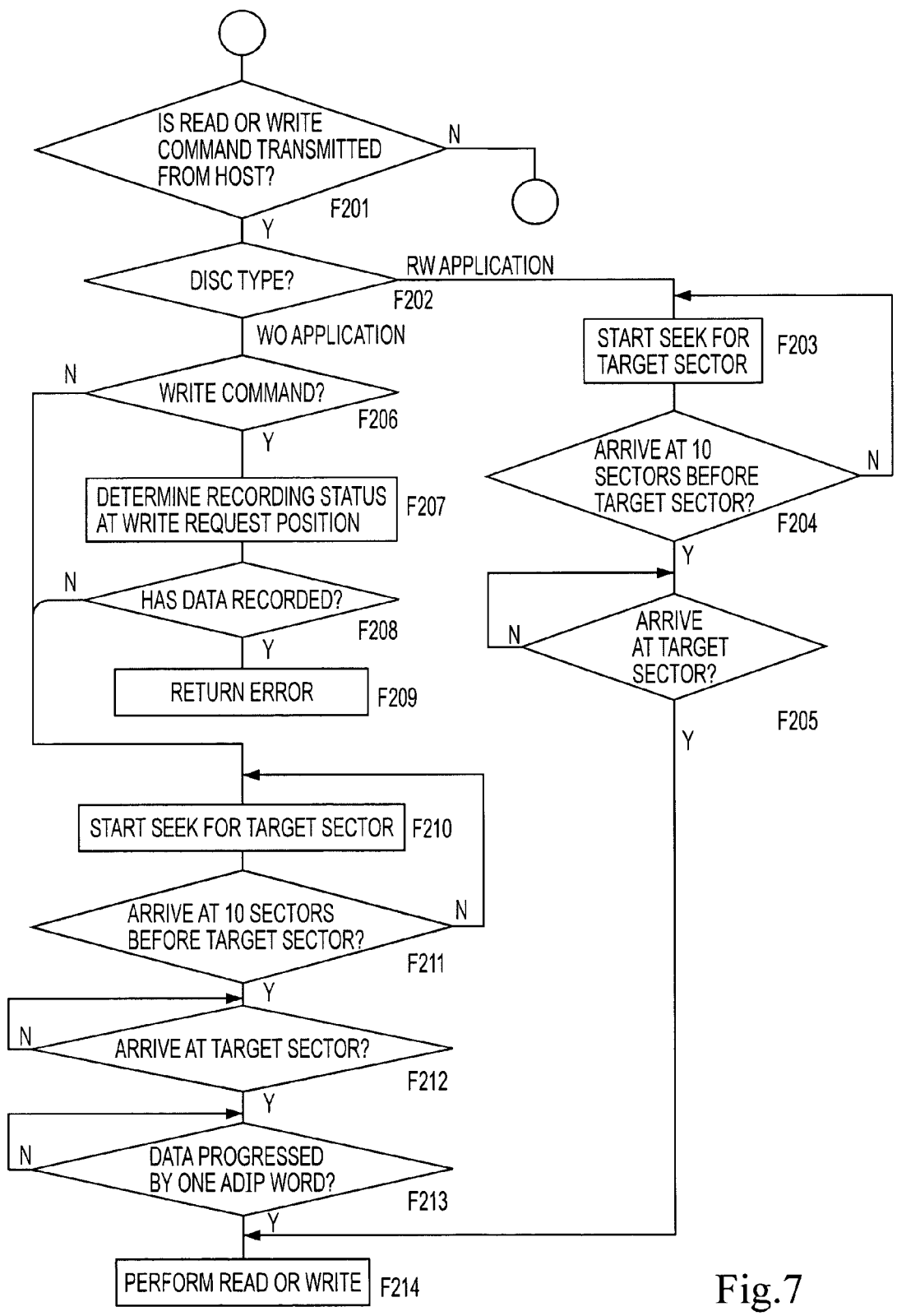
FIG. 7 is a flowchart showing a process of recording or playing back the data according to an embodiment.

The disc drive apparatus according to this embodiment is capable of appropriately and selectively using the rewritable disc in the rewritable application and in the write-once application through processes shown in FIGS. 6 and 7.

Whether the disc 1, which is physically the rewritable disc, is used in the rewritable application or in the write-once application is determined in advance.

In other words, the rewritable disc used in the write-once application is manufactured only for the write-once application.

However, it is sufficient to indicate the fact that the rewritable disc is used in the write-once application in the physical format information. In the physical format information (PFI) recoded as the ADIP information, shown in FIG. 11, the information indicating whether the disc is used in the rewritable application or in the write-once application is specified in, for example, the disc category/version number in the PFI.

Since the ADIP information cannot be physically rewritten, the application of the disc is fixed in the manufacture thereof.

FIG. 6 shows a process when the disc is loaded under the control of the CPU 15 in the disc drive apparatus according to this embodiment.

After the disc 1 is loaded, the process proceeds from Step F101 to Step F102. In Step F102, the CPU 15 starts startup processing. Specifically, for example, the CPU 15 activates the spindle motor, stabilizes the rotational speed, turns on the focus search/focus servo, turns on the tracking servo, and reads the management information, such as the PFI, as the initialization operation.

In Step F103, the CPU 15 receives the PFI read out as the ADIP information to determine the type of the disc. Particularly, when the loaded disc 1 is physically a rewritable disc, the CPU 15 determines whether the disc 1 is used in the rewritable application or in the write-once application. In Step F104, the CPU 15 defines the attribute of the disc. In Step F105, the CPU 15 waits for commands to be supplied from the host device 100.

FIG. 7 shows a process performed when a read or write command is transmitted from the host device 100.

After the CPU 15 receives a command from the host device 100, the process proceeds from Step F201 to F202 to branch in accordance with the type of the disc.

When the attribute of the loaded disc 1 is defined as the rewritable application, the process proceeds to Step F203. In Step F203, the process causes the servo signal processor 9b to start seek for the target sector of the optical pickup 3 based on the address indicated by the read or write command.

In Step F204, the process determines whether the seek operation arrives at, for example, a position ten sectors before the target sector. If the seek operation arrives at the position ten sectors before the target sector, the process advances the seek operation toward the target sector with the recording track being traced.

In Step F205, the process determines whether the seek operation arrives at the target sector. If the seek operation arrives at the target sector, then in Step F214, the process performs a required operation, that is, plays back the data on the disc 1 or records the data on the disc 1.

In this processing, writing of the data is started at the position P2 away from the wobble reference position P1 by 16 wobbles when the data is recorded based on the write command, while the data writing start position is determined from the first sync detected near the position P2 away from the wobble reference position P1 by 16 wobbles to read out the data recorded on the section subsequent to the position P2 when the data is played back based on the read command.

When the loaded disc 1 is to be used in the write-once application, the process proceeds from Step F202 to F206.

In Step F206, the process branches based on the determination of whether the command transmitted from the host device 100 is the read command or the write command. If the transmitted command is the write command, the process proceeds to Step F207. In Step F207, the process determines the recording status at the write request position based on the address indicated in the write command. In the write-once application, rewriting of the data on the rewritable disc must be disabled. Accordingly, if the process determines that the data has been recorded in the address range indicated in the write command, the process proceeds from Step F208 to Step F209 to return an error to the host device 100.

In other words, if a command instructing rewriting of the data is transmitted from the host device 100, rewriting of the data is disabled because the rewritable disc is used in the write-once application.

If the transmitted command is the read command or the write command instructing writing in an area where the data is not recorded, the process proceeds to Step F210. In Step F210, the process causes the servo signal processor 9b to start seek for the target sector of the optical pickup 3 based on the address indicated by the read or write command.

In Step F211, the process determines whether the seek operation arrives at, for example, a position ten sectors before the target sector. If the seek operation arrives at the position ten sectors before the target sector, the process advances the seek operation toward the target sector with the recording track being traced.

In Step F212, the process determines whether the seek operation arrives at the target sector. If the seek operation arrives at the target sector, then in Step F213, the process waits for progress of the data by one ADIP word.

After the data progressed by one ADIP word, in Step F214, the process performs a required operation, that is, plays back the data on the disc 1 or records the data on the disc 1.

In this processing, writing of the data is started at the position P3 away from the wobble reference position P1 by at least one ADIP word when the data is recorded based on the write command, while the data writing start position P3 is determined from the first sync detected at a position away from the wobble reference position P1 by one ADIP word or more to read out the data recorded on the section subsequent to the position P3 when the data is played back based on the read command.

In the above process, the monitoring of the position ten sectors before the target sector and the waiting of the progress of the data by one ADIP word in Step F213 are only examples. The section length in Step F213 is set such that the recording or playback of the data is started from the position P3 set in the range away from the wobble reference position P1 by more than one ADIP word and less than four ADIP words.

As described above, in the disc drive apparatus according to this embodiment, the recording or playback of the data is started from the position P2 away from the wobble reference position P1 by 16 wobbles when the RW data is to be recorded or played back, while the recording or playback of the data is started from the position P3 set in the range away from the wobble reference position P1 by more than one ADIP word and less than four ADIP words when the WO data is to be recorded or played back.

In other words, as described above with reference to FIGS. 2 and 3, the position where writing of the data is started differs between the rewritable application and the write-once application.

As a result, it is possible to keep the write-once characteristics in the write-once application as described below.

In the disc drive apparatus according to this embodiment, that is, in the disc drive apparatus performing the processes shown in FIGS. 6 and 7, the data can be appropriately recorded or played back on the disc 1 used in the write-once application because the recording or playback is started from the position P3 and recording of the data (rewriting of the data) is disabled in areas where the data has been recorded. Accordingly, the rewritable disc for the write-once application can be used as a disc which has the same usability as the normal write-once disc and on which updating of the data is disabled as in the normal write-once disc.

In contrast, in another disc drive apparatus, that is, in a disc drive apparatus that do not performs the processes shown in FIGS. 6 and 7, the disc 1 for the write-once application cannot be used. In other words, since the data writing start position cannot be detected, playback or rewriting of the data is disabled. Accordingly, the data on the disc 1 used in the write-once application, the data being recorded by the disc drive apparatus according to this embodiment, cannot be rewritten by the other disc drive apparatus. As a result, the characteristic in that the data cannot be updated is maintained in any disc drive apparatus.

Consequently, it is possible to realize a recording-playback system capable of using the rewritable disc in the write-once application.

According to this embodiment, the information indicating whether the disc 1 is used in the rewritable application or in the write-once application is recorded in the disc 1 as the ADIP information, which is the playback-only information. This means that the information indicating whether the disc 1 is used in the rewritable application or in the write-once application is set for every rewritable disc physically having the phase-change recording layer, and also means that the rewritable recording medium for the write-once application cannot be changed to the rewritable recording medium for the rewritable application.

Since the application is defined for every disc, the usage of the disc is definite and the usability is improved. In addition, there is no risk in that the data cannot be appropriately recorded or played back because the disc that has been used in the rewritable application is changed to the disc for the write-once application.

In a disc medium in which embossed pits are formed in advance and the management and physical information is recorded as the embossed pits, the information indicating whether the disc is used in the rewritable application or in the write-once application may be recorded as the information in the embossed pits.

Although the position P3 where writing of the data is started in the write-once application is set in the range away from the reference position P1 by more than one ADIP word and less than four ADIP words in the above embodiment, this range is effective for the ECC block format described above. A different range is applied to the position P3 in different ADIP word or sector structures.

The position P3 where writing of the data is started in the write-once application is set to any position where the ECC block unit cannot be extracted when the WO data recorded from the position P3 is played back from the position P2 as in the RW data.

Although the structure and operation of the disc drive apparatus (recording-playback apparatus) corresponding to the recording apparatus and the playback apparatus of the present invention are shown in the above embodiments, the present invention may be embodied by a playback-only apparatus or a recording-only apparatus. Specifically, as in the above disc drive apparatus, the present invention is embodied by the recording-only apparatus starting the recording operation from the position P3 in the write-once application and by the playback-only apparatus starting the playback operation from the position P3 in the write-once application.

INDUSTRIAL APPLICABILITY

According to the present invention, when the rewritable recording medium is used in rewritable application, the position where writing of a predetermined data unit is started is set to a first position with respect to the reference position to record or play back the data. When the rewritable recording medium is used in the write-once application, the position where writing of the predetermined data unit is started is set to a second position different from the first position to record or play back the data. Accordingly, when the rewritable recording medium for the write-once application is loaded in a recording-playback apparatus that does not assume the use in the write-once application, the data recorded on the recording medium cannot be rewritten.

In the recording apparatus of the present invention, the rewritable recording medium used in the write-once application can be appropriately used as a write-once medium on which data cannot be rewritten under the control of, for example, firmware. Furthermore, even when the rewritable recording medium used in the write-once application is loaded in another recording-playback apparatus, it can maintain a state in which the data cannot be rewritten (falsified). As a result, the rewritable recording medium can be appropriately used in the write-once application while taking the advantage of the write-once medium, in that the data cannot be falsified. The rewritable recording medium is suitable as, for example, a data storage device for business use.

With the playback apparatus of the present invention, the data recorded on the rewritable disc for the write-once application, on which disc the data is recorded from the second position, can be appropriately played back.

The recording apparatus and playback apparatus of the present invention determines whether the recording medium is used in the rewritable application or in the write-once application based on the disc type information recorded on the recording medium as playback-only information, which cannot be physically rewritten. This means that the information indicating whether the recording medium is used in the rewritable application or in the write-once application is set for every recording medium, which is physically the rewritable medium, and also means that the rewritable recording medium for the write-once application cannot be changed to the rewritable recording medium for the rewritable application. Since the application is defined for every recording medium, the usage of the recording medium is definite and the usability is improved. In addition, there is no risk in that the data cannot be appropriately recorded or played back because the recording medium that has been used in the rewritable application is changed to the recording medium for the write-once application.

In terms of the operation, it is desirable that the recording medium be a recording medium on which the playback-only information is recorded in the wobbling groove formed on the data track and that the reference position on which the first and second positions are based be defined for every unit of information in the playback-only information in the wobbling groove.

In order to disable rewriting of the data when the recording medium is loaded in another recording-playback apparatus, it is desirable that the second position be set such that the data cannot be extracted in units of error correction block when the data recorded from the second position is played back from the first position.

The invention claimed is:

1. A recording apparatus comprising:
    recording means for recording data on a recording medium that is loaded and that has a rewritable physical structure;
    determining means for determining whether the loaded recording medium is used in rewritable application in which the data is capable of being rewritten or in write-once application in which the data is capable of being written only once; and
    controlling means for setting a position where writing of a predetermined data unit in the data is started to a first position with respect to a reference position to cause the recording means to record the data, when the determining means determines that the recording medium is used in the rewritable application, and for setting the position where writing of the predetermined data unit in the data is started to a second position with respect to the reference position to cause the recording means to record the data, when the determining means determines that the recording medium is used in the write-once application.

2. The recording apparatus according to claim 1, wherein the determining means determines whether the recording medium is used in the rewritable application or in the write-once application based on type information recoded on the recording medium as playback-only information that is not physically rewritable.

3. The recording apparatus according to claim 1, wherein the recording medium has playback-only information recorded in a wobbling groove formed in a data track, and
wherein the reference position is defined in units of information in the playback-only information in the wobbling groove.

4. The recording apparatus according to claim 1, wherein the predetermined data unit is a unit of error correction block, and
wherein the second position is set to a position where the error correction block cannot be extracted when the data recorded from the second position is played back from the first position.

5. A recording method comprising:
    a determining step of determining whether a recording medium that is loaded and that has a rewritable physical structure is used in rewritable application in which data is capable of being rewritten or in write-once application in which the data is capable of being written only once;
    a first recording step of setting a position where writing of a predetermined data unit in the data is started to a first position with respect to a reference position in accordance with a recording instruction to record the data, when it is determined in the determining step that the recording medium is used in the rewritable application; and
    a second recording step of setting the position where writing of the predetermined data unit in the data is started to a second position with respect to the reference position in accordance with the recording instruction to record the data, when it is determined in the determining step that the recording medium is used in the write-once application.

6. A playback apparatus comprising:

playback means for playing back data on a recording medium that is loaded and that has a rewritable physical structure;

determining means for determining whether the loaded recording medium is used in rewritable application in which the data is capable of being rewritten or in write-once application in which the data is capable of being written only once; and controlling means for setting a position where writing of a predetermined data unit in the data is started to a first position with respect to a reference position to cause the playback means to play back the data, when the determining means determines that the recording medium is used in the rewritable application, and for setting the position where writing of the predetermined data unit in the data is started to a second position with respect to the reference position to cause the playback means to play back the data, when the determining means determines that the recording medium is used in the write-once application.

7. The playback apparatus according to claim 6, wherein the determining means determines whether the recording medium is used in the rewritable application or in the write-once application based on type information recoded on the recording medium as playback-only information that is not physically rewritable.

8. The playback apparatus according to claim 6, wherein the recording medium has playback-only information recorded in a wobbling groove formed in a data track, and wherein the reference position is defined in units of information in the playback-only information in the wobbling groove.

9. The playback apparatus according to claim 6, wherein the predetermined data unit is a unit of error correction block, and wherein the second position is set to a position where the error correction block cannot be extracted when the data recorded from the second position is played back from the first position.

10. A playback method comprising:

a determining step of determining whether a recording medium that is loaded and that has a rewritable physical structure is used in rewritable application in which data is capable of being rewritten or in write-once application in which the data is capable of being written only once;

a first playback step of setting a position where writing of a predetermined data unit in the data is started to a first position with respect to a reference position in accordance with a playback instruction to play back the data, when it is determined in the determining step that the recording medium is used in the rewritable application; and a second playback step of setting the position where writing of the predetermined data unit in the data is started to a second position with respect to the reference position in accordance with the playback instruction to play back the data, when it is determined in the determining step that the recording medium is used in the write-once application.

* * * * *